UNITED STATES PATENT OFFICE 2,203,699

FIBROUS ACETONE SOLUBLE CELLULOSE ACETATE OF 58-60% ACETYL CONTENT

George W. Seymour and Blanche B. White, Cumberland, Md., assignors to Celanese Corporation of America, a corporation of Delaware No Drawing. Application February 28, 1939, Serial No. 258,949

5 Claims. (Cl. 260—230)

This invention relates to the production of organic esters of cellulose and relates more particularly to the production of stabilized organic esters of cellulose of high acyl value in fibrous form.

An object of the invention is the production of stable organic esters of cellulose of a high acyl value. Another and specific object of the invention is the production of cellulose acetate having an acetyl value of from 55 to 62.5, calculated as acetic acid, which is in a fibrous form such that it may readily be stabilized. Other objects of our invention will appear from the following detailed description and claims.

This invention is applicable to the production of an organic ester of cellulose, such as cellulose formate, cellulose acetate, cellulose butyrate and cellulose propionate. For simplifying the description of the invention, however, particular reference will be made to the production of cellulose acetate which is the most commercially important at the present time.

Esters of cellulose having substantially a triester degree of esterification have been produced heretofore but these esters have not been stable and were incapable of stabilization until sufficient hydrolysis had occurred to lower the acyl value thereof to below that of the cellulose tri-ester. One reason for this is that there was no known method of precipitating the cellulose ester from the solution in which it was formed in such a condition that it could be stabilized. Prior attempts made to precipitate such cellulose esters resulted in a glassy precipitate which, although ground to very minute size, was not capable of being freed of catalyst and other compounds which affected the hydrolysis of the ester.

Stabilized esters of cellulose of a high acyl value have many desirable properties. They do not deluster readily and retain this property over a substantial period of time so that yarns of two different ages may be woven together without producing a fabric having defects therein due to differential delustering developed during scouring and dyeing treatments. Cellulose esters of high acyl value show a lower moisture regain and films made from the same have a greater resistance to blush, distortion and cockling. Fabrics prepared from high acyl cellulose esters can be processed at higher temperatures in dyeing, thereby increasing the dyeing and levelling rates without the attending tendency to deluster or give a rubbery hand.

The present invention is applicable to the production of organic esters of cellulose wherein the esterification is effected in the presence of a catalyst containing sulphuric acid and/or phosphoric acid. For instance, this invention is applicable where esters of cellulose are produced by reacting a suitable cellulose, such as cotton, cotton linters, wood pulp, etc., with an organic acid anhydride in the presence of glacial acetic acid or other solvent for the ester as it is formed and a catalyst. The catalyst may be sulphuric acid, phosphoric acid or compounds containing these acid radicals, or mixtures of either or both of these acids with compounds containing chlorine.

In the production of cellulose acetate, for example, cotton linters with or without a pretreatment are esterified by reacting it with acetic anhydride in the presence of a catalyst such as sulphuric acid and of sufficient glacial acetic acid to dissolve the cellulose acetate produced. The cellulose acetate if precipitated without further treatment is in the form of a glassy precipitate from which all of the catalyst and esterifying acid cannot be removed. Such cellulose acetate therefore is not stable. By employing our invention, however, the cellulose acetate may be precipitated in a fibrous form with but a very slight or no apparent hydrolysis. The combined sulphuric acid is selectively split off from the cellulose acetate molecule without splitting off of the acetic acid radical and, as the cellulose acetate is precipitated in a fibrous form, the step of subjecting the cellulose acetate to stabilization treatments, such as with boiling water, boiling water containing bivalent metallic salts and/or basic organic compounds, the sulphuric acid or other catalyst employed is removed from the cellulose ester or converted to a form in which it does not lower the stability of the cellulose ester.

In accordance with this invention, we produce a stable cellulose acetate by precipitating the cellulose acetate directly from the original primary solution in a fibrous form, apparently neither decomposed nor hydrolyzed and having an acetyl value above 55. This we accomplish by arresting the acetylation at or near that point at which the cellulose acetate has the highest acetyl value by adding water in an amount only just sufficient to convert the remaining acetic anhydride to acetic acid, then adding about 3.6 to 28.8 parts of water for every 100 parts of cellulose acetate. The solution of the cellulose acetate containing a limited amount of water is then allowed to ripen at a temperature between 28 and 33° C. for from 4 to 30 hours. Upon the addition of this ripened charge to water the cellulose acetate is precipitated in a fibrous form and has a fairly high stability and an acetyl value of above 55. Where the charge has been ripened for the shorter period of time the cellulose acetate will have an acetyl value of from 58 to 60. The greater amount of water is employed where large amounts of catalyst are used and the smaller amount where limited amounts of catalyst are employed. In describing this invention and in the appended claims the acetyl value is given in terms of percentage by weight of the combined acid radical calculated as acetic acid.

The small amount of water causes the hydrolysis of the combined sulphates and as the free sulphuric acid concentration increases in the water molecular decomposition occurs. Also if the temperature is not kept reasonably low deacetylation takes place as is the case when larger quantities of water are employed. Accordingly, by using small amounts of water and limiting the time in which the water is hydrolyzing the combined sulphates, thus preventing molecular decomposition, cellulose acetate of high acetyl value is produced, which cellulose acetate has a high Staudinger viscosity evidencing the absence of decomposition of the molecule. The use of a small amount of ripening water for a short time removes the sulphate to such an extent that reasonably stable solid primary cellulose acetates can be obtained by the simple addition of a larger amount of precipitating liquid.

The amount of water employed is of importance for it is not until the quantity of water reaches about 7.2 parts to 100 parts of cellulose acetate that high acetone-solubility of the cellulase acetate accompanied by a fair stability is obtained. With this addition of water, after 19 to 27 hours the acetyl value varies between 58 and 60%. When water is added in an amount greater than 28.8 parts per 100 parts of cellulose acetate, the decrease of acetyl value appears to be fairly rapid so that while moderately stable cellulose acetate of satisfactory acetone-solubility is obtained, the acetyl value thereof is no longer as high as is desired. We prefer to employ 7.2 parts of water to 100 parts of cellulose acetate when 14.5 parts of sulphuric acid are employed as the catalyst. When larger amounts of sulphuric acid are present larger amounts of water up to 28.8 parts per 100 parts of cellulose acetate may be employed.

As an illustration of our invention, but without being limited thereto, the following example is given:

*Example*

A primary solution containing 100 parts by weight of cellulose tri-acetate and 14.5 parts by weight of sulphuric acid, combined or otherwise, is obtained from an esterification process. To this solution is added water in an amount just sufficient to convert the excess acetic anhydride to acetic acid and then adding 7.2 parts by weight of water and the same is allowed to stand for 27 hours at 30 C. after which additional water is whipped into the mass effecting a precipitation of the cellulose acetate. The precipitated material is in a fluffy fibrous form having an acetyl value of 58.2, a heat test from 203 to 205 and is readily soluble in acetone.

It is to be understood that the foregoing detailed description is merely given by way of example and that many variations may be made therein without departing from the spirit of our invention.

Having described our invention, what we desire to secure by Letters Patent is:

1. Process for the manufacture of cellulose acetate, which comprises adding to the primary solution, containing the cellulose acetate, the excess acetic anhydride employed in the acetylation process and catalyst, water in amount just sufficient to convert the anhydride to acetic acid and an additional 3.6–28.8 parts by weight of water for every 100 parts by weight of cellulose acetate formed in the primary solution, permitting the cellulose acetate to ripen at a temperature between 28 and 33° C. to an acetyl value of 58–60% and precipitating the cellulose acetate from the resulting solution in fibrous form as an acetone-soluble product having an acetyl value of 58–60%.

2. Process for the manufacture of cellulose acetate, which comprises adding to the primary solution, containing the cellulose acetate, the excess acetic anhydride employed in the acetylation process and catalyst, water in amount just sufficient to convert the anhydride to acetic acid and an additional 3.6–28.8 parts by weight of water for every 100 parts by weight of cellulose acetate formed in the primary solution, permitting the cellulose acetate to ripen at a temperature between 28 and 33° C. for from 4–30 hours and precipitating the cellulose acetate from the resulting solution in fibrous form as an acetone-soluble product having an acetyl value of 58–60%.

3. Process for the manufacture of cellulose acetate, which comprises adding to the primary solution, containing the cellulose acetate, the excess acetic anhydride employed in the acetylation process and catalyst, water in amount just sufficient to convert the anhydride to acetic acid and an additional 7.2 parts by weight of water for every 100 parts by weight of cellulose acetate formed in the primary solution, permitting the cellulose acetate to ripen at a temperature between 28 and 33° C. to an acetyl value of 58–60% and precipitating the cellulose acetate from the resulting solution in fibrous form as an acetone-soluble product having an acetyl value of 58–60%.

4. Process for the manufacture of cellulose acetate, which comprises adding to the primary solution, containing the cellulose acetate, the excess acetic anhydride employed in the acetylation process and catalyst, water in amount just sufficient to convert the anhydride to acetic acid and an additional 7.2 parts by weight of water for every 100 parts by weight of cellulose acetate formed in the primary solution, permitting the cellulose acetate to ripen at a temperature between 28 and 33° C. for from 4–30 hours and precipitating the cellulose acetate from the resulting solution in fibrous form as an acetone-soluble product having an acetyl value of 58–60%.

5. Process for the manufacture of cellulose acetate, which comprises adding to the primary solution, containing the cellulose acetate, the excess acetic anhydride employed in the acetylation process and catalyst, water in amount just sufficient to convert the anhydride to acetic acid and an additional 7.2 parts by weight of water for every 100 parts by weight of cellulose acetate formed in the primary solution, permitting the cellulose acetate to ripen at a temperature of 30° C. for 27 hours, and precipitating the cellulose acetate from the resulting solution in fibrous form as an acetone-soluble product having an acetyl value of 58–60%.

GEORGE W. SEYMOUR.
BLANCHE B. WHITE.